(12) United States Patent
Karandikar et al.

(10) Patent No.: US 9,906,001 B2
(45) Date of Patent: Feb. 27, 2018

(54) PASSIVE COOLING SYSTEM FOR SWITCHGEAR WITH STAR-SHAPED CONDENSER

(75) Inventors: Harshavardhan M. Karandikar, Longwood, FL (US); Patrik Kaufmann, Baden (CH)

(73) Assignee: ABB Schweiz AG, Baden (CH)

( * ) Notice: Subject to any disclaimer, the term of this patent is extended or adjusted under 35 U.S.C. 154(b) by 312 days.

(21) Appl. No.: 13/604,966

(22) Filed: Sep. 6, 2012

(65) Prior Publication Data
US 2014/0060779 A1   Mar. 6, 2014

(51) Int. Cl.
| | | |
|---|---|---|
| *H01H 9/52* | (2006.01) | |
| *H01L 23/427* | (2006.01) | |
| *F28F 1/16* | (2006.01) | |
| *H02B 1/56* | (2006.01) | |

(52) U.S. Cl.
CPC ...................... *H02B 1/56* (2013.01)

(58) Field of Classification Search
CPC .......... F28F 1/16; F28D 15/0266; H02B 1/00; H02B 1/56; H01H 9/52; H01H 2009/523; H01L 23/427
USPC ....... 165/80.1, 80.2, 104.21, 104.26, 104.33; 361/676–678, 679.47, 679.52, 700
See application file for complete search history.

(56) References Cited

U.S. PATENT DOCUMENTS

| | | | | |
|---|---|---|---|---|
| 2,958,021 A | * | 10/1960 | Cornelison ............. | F28D 15/02 165/104.21 |
| 3,330,130 A | * | 7/1967 | Schraith ............. | F28D 15/0266 165/104.21 |
| 3,662,137 A | * | 5/1972 | Cleaveland ............. | H01H 1/62 165/104.26 |
| 3,764,765 A | * | 10/1973 | Olashaw ....................... | 200/289 |
| 3,769,551 A | * | 10/1973 | Corman et al. ................ | 361/676 |
| 3,788,389 A | * | 1/1974 | Waters ............................ | 165/45 |
| 3,823,769 A | * | 7/1974 | Anderson et al. .............. | 165/76 |

(Continued)

FOREIGN PATENT DOCUMENTS

| | | | | |
|---|---|---|---|---|
| DE | 3912152 A1 | * | 10/1990 | ........... H01L 23/427 |
| FR | 2604827 A1 | * | 4/1988 | ........... H01L 23/427 |

(Continued)

OTHER PUBLICATIONS

English translation of FR 2604827 A1.*

*Primary Examiner* — Grant Moubry
*Assistant Examiner* — For K Ling
(74) *Attorney, Agent, or Firm* — Manelli Selter PLLC; Edward J. Stemberger

(57) ABSTRACT

A condenser for condensing vapor to liquid for cooling a switchgear having a heat generating component inside an enclosure and tubing structure associated with the heat generating component. A working fluid is disposed within an end portion of the tubing structure. The condenser includes a hollow tubular base defining a volume and having first and second opposing opened ends. A plurality of fins extends from a periphery of the base. The fins are in spaced relation and disposed about the entire circumference of the base. A first end cap is coupled to the base so as to close the first opened end. A second end cap is coupled to the base to close the second opened end. The second end cap has port structure constructed and arranged to fluidly communicate the tubing structure with the volume.

10 Claims, 4 Drawing Sheets

(56) References Cited

U.S. PATENT DOCUMENTS

| | | | | |
|---|---|---|---|---|
| 3,852,804 A | * | 12/1974 | Corman | H01L 23/427 165/104.21 |
| 3,852,805 A | * | 12/1974 | Brzozowski | H01L 23/427 165/104.26 |
| 3,852,806 A | * | 12/1974 | Corman | H01L 23/427 165/104.26 |
| 3,902,547 A | * | 9/1975 | Waters | 165/45 |
| 3,935,900 A | * | 2/1976 | Waters | 165/45 |
| 4,005,297 A | * | 1/1977 | Cleaveland | 218/118 |
| 4,036,286 A | * | 7/1977 | Anderson et al. | 165/45 |
| 4,090,555 A | * | 5/1978 | Anderson et al. | 165/76 |
| 4,123,618 A | * | 10/1978 | Cushing et al. | 174/11 BH |
| 4,358,631 A | * | 11/1982 | Matsuda | 174/15.3 |
| 4,399,660 A | * | 8/1983 | Vogler et al. | 62/50.2 |
| 4,586,561 A | * | 5/1986 | Franco et al. | 165/104.27 |
| 4,640,347 A | * | 2/1987 | Grover et al. | 165/104.26 |
| 4,782,890 A | * | 11/1988 | Shimodaira et al. | 165/104.27 |
| 4,884,628 A | * | 12/1989 | En-Jian et al. | 165/104.27 |
| 5,029,633 A | * | 7/1991 | Mann | 165/45 |
| 5,174,371 A | * | 12/1992 | Grillo | 165/171 |
| 5,283,464 A | * | 2/1994 | Murase | F28D 15/0275 165/104.14 |
| 5,505,810 A | * | 4/1996 | Kirby et al. | 156/286 |
| 6,155,058 A | * | 12/2000 | Kanno et al. | 62/45.1 |
| 6,209,625 B1 | * | 4/2001 | Guo | 165/104.21 |
| 7,013,955 B2 | * | 3/2006 | Phillips et al. | 165/104.21 |
| 7,093,647 B2 | * | 8/2006 | Take | 165/80.3 |
| 7,253,379 B2 | * | 8/2007 | Lakner et al. | 219/494 |
| 7,471,495 B2 | * | 12/2008 | Steffens et al. | 361/115 |
| 7,557,295 B2 | | 7/2009 | Kiefer et al. | |
| 7,771,114 B2 | | 8/2010 | Kiefer et al. | |
| 8,711,550 B2 | * | 4/2014 | Frigiere et al. | 361/677 |
| 2006/0120024 A1 | | 6/2006 | Chartouni | |
| 2008/0000879 A1 | | 1/2008 | Steffens et al. | |
| 2008/0049384 A1 | | 2/2008 | Unternaehrer et al. | |
| 2009/0014154 A1 | * | 1/2009 | Schick et al. | 165/80.3 |
| 2009/0056916 A1 | | 3/2009 | Yesin et al. | |
| 2009/0255794 A1 | * | 10/2009 | Kurth | H01H 9/52 200/289 |
| 2010/0270010 A1 | | 10/2010 | Agostini | |
| 2011/0180292 A1 | * | 7/2011 | Widmer | H02G 5/10 174/15.2 |
| 2012/0205074 A1 | * | 8/2012 | Frigiere et al. | 165/104.26 |

FOREIGN PATENT DOCUMENTS

| | | |
|---|---|---|
| WO | 2011051476 | 5/2011 |
| WO | 2011051477 | 5/2011 |

\* cited by examiner

PASSIVE COOLING SYSTEM FOR SWITCHGEAR WITH STAR-SHAPED CONDENSER

FIELD

The invention relates to switchgear circuit breakers and, more particularly, to a cooling system that includes star-shaped condensers.

BACKGROUND

Switchgear configurations have current limits based on the heat rise over ambient room temperature. It is generally desired to limit the maximum temperature of the hottest spot on the switchgear main bus to 105° C. (a rise of 65° C. over an assumed ambient temperature of 40° C.), as directed by the standard IEEE 37.20.2. Typical medium and high-voltage metal-clad switchgear arrangements have maximum continuous current ratings of about 3000 A, due to heat generation. It is desirable to increase this current rating to 4000 A and above.

With reference to FIG. 1, a conventional heat pipe based cooling system, generally indicated at 10, offers an additional path for heat dissipation to the ambient environment outside a switchgear enclosure 12. Such a system is disclosed in co-pending U.S. application Ser. No. 13/444,888, filed on Apr. 12, 2012. Heat can be transported from a heat source very effectively by making use of a thermally driven evaporation and condensation process, and subsequently dissipated to a heat sink. Heat pipes are vacuum tight systems, partially filled with a working fluid. A dedicated evaporator section (heat input from the switchgear), generally indicated at 14, can be connected to a condenser 16 (heat output to the environment) by means of flexible and very compact heat pipe or tubing structure 18. Such a system can be employed as an integral part of the switchgear enclosure system without breaching the requirements for self-contained compartments.

The switchgear equipment could be cooled by one common heat pipe network, with one condenser serving as heat sink, or with several heat pipes, which are operated in parallel and with independent, rectangular-box type condensers 16. The condenser 16 is preferably located at the backside or on top of the switchgear housing 12.

The condenser outlays account for about 50% of the total cost of the system. Also, a conventional condenser 176 is built from one large aluminum rectangular body with six independent chambers for each of the heat pipes, which leads to a heavy construction that is cumbersome for installation.

Thus, there is a need to provide condenser structure that reduces manufacturing cost and that is modular and easy to install in a limited space.

SUMMARY

An objective of the invention is to fulfill the need referred to above. In accordance with the principles of the present invention, this objective is achieved by providing a condenser for condensing vapor to liquid for cooling switchgear. The switchgear has at least one heat generating component inside an enclosure, and tubing structure associated with the heat generating component. A working fluid is disposed within an end portion of the tubing structure that is associated with the heat generating component. The condenser includes a hollow tubular base defining a volume and has first and second opposing opened ends. The base has a circumference. A plurality of fins extends from a periphery of the base. The fins are in spaced relation and are disposed about the entire circumference of the base. A first end cap is coupled to the base so as to close the first opened end. A second end cap is coupled to the base to close the second opened end. The second end cap has port structure constructed and arranged to fluidly communicate the tubing structure with the volume so that when the working fluid is heated to a vapor state by the heat generating component, the tubing structure is constructed and arranged to transfer the vapor to the condenser, with the fins transferring heat to surrounding air by natural convection and the vapor being phased changed to liquid within in the volume of the base. The liquid is passively returned back to the end of the tubing structure thereby cooling the at least one heat generating component.

In accordance with another aspect of an embodiment, a method cools a switchgear having at least one heat generating component inside an enclosure of the switchgear. The method provides a condenser mounted outside of the enclosure. The condenser includes a hollow tubular base defining a closed volume. The base has a circumference. A plurality of fins extends from a periphery of the base. The fins are in spaced relation and disposed about the entire circumference of the base. The volume fluidly communicates with tubing structure. The tubing structure is associated with the heat generating component. A working fluid is provided within an end portion of the tubing structure that is associated with the heat generating component. Heat is transferred from the heat generating component to the working fluid to cause the working fluid to evaporate, with the evaporated vapor being delivered to the condenser via the tubing structure. Heat is transferred to surrounding air by natural convection via the fins, with the vapor being phased changed to liquid within in the volume of the base. The liquid is passively returned back to the end of the tubing structure, thereby cooling at least one heat generating component.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENTS

Figure 2:
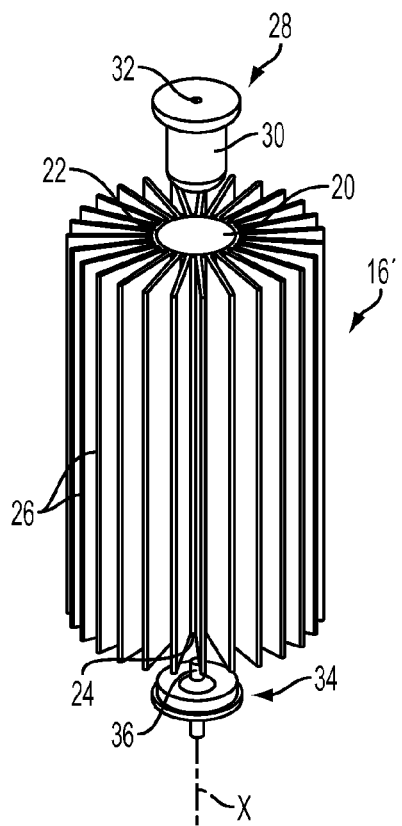
FIG. 2 is an exploded view of a star-shaped condenser, provided in accordance with an embodiment, for switchgear evaporative cooling system of the type shown in FIG. 1.
Figure 3A:
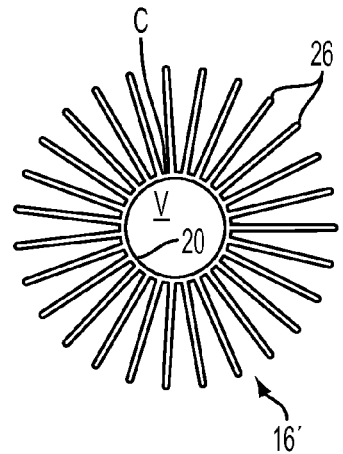
FIGS. 3a-3c show various ways of configuring the star-shaped condenser of FIG. 2.

With reference to FIG. 2, a condenser, generally indicated at 16', provided in accordance with an embodiment, for switchgear evaporative cooling system is shown. The condenser 16' includes a hollow, tubular base 20 having first and second opposing opened ends 22 and 24, respectively. The base 20 has a circumference C and an internal volume V (FIG. 3a). A plurality of fins 26 extend from the periphery of the base 20 in a cantilever manner. The fins 26 are in spaced relation and are disposed about the entire circumference C of the base 20. Thus, when viewed from the end, the condenser is generally star-shaped and is symmetric about the longitudinal axis X. The condenser 16' is preferably made from extruded profiles such as from aluminum with minimized wall thickness.

Figure 3B:
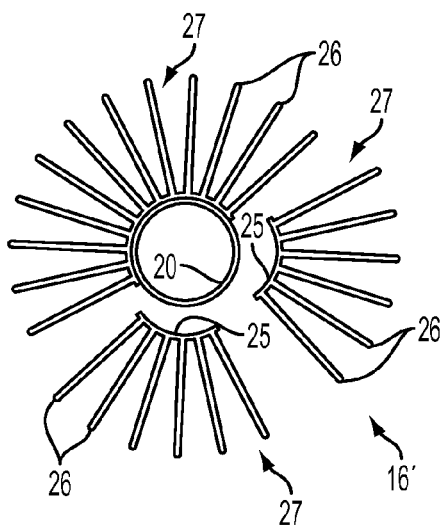
Figure 3C:
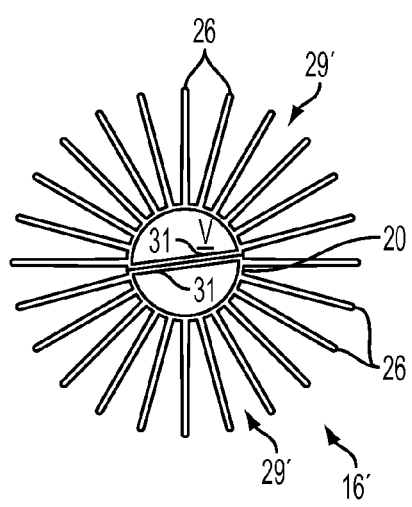

With reference to FIGS. 3a-3c, the star-shaped condenser 16' can be manufactured in various ways, all of which have in common that the fins 26 are made from an extruded profile. FIG. 3a shows a one-piece construction of the base 20 and fins 26. FIG. 3b shows a base 20 and separated fin sections, generally indicated at 27. Each fin section 27 includes an arc member 25 and fins 26 coupled thereto. Each arc member 25 is coupled to the periphery of the base 20. FIG. 3c shows a two-piece construction with a first section 29 joined to a second section 29' at walls 31 thereof, internal of volume V. FIGS. 3a-3c show simplified examples, but the outer fins 26 can be grooved axially in order to increase the surface area or/and each fin 26 can be branched additionally. Other more sophisticated heat transfer enhancements include mechanical (e.g., sandblasting) and chemical treatment of the surface. Furthermore, the radiative heat transfer could be improved by surface coatings, paintings or anodization.

Returning to FIG. 2, a top cap, generally indicated at 28, is received in the first opened end 22 to close the first opened end 22. The top end cap 28 includes a drying agent container 30 for receiving a drying agent to absorb diffused water over a long period of time. The top end cap 28 also preferably includes a service port 32.

Figure 1:
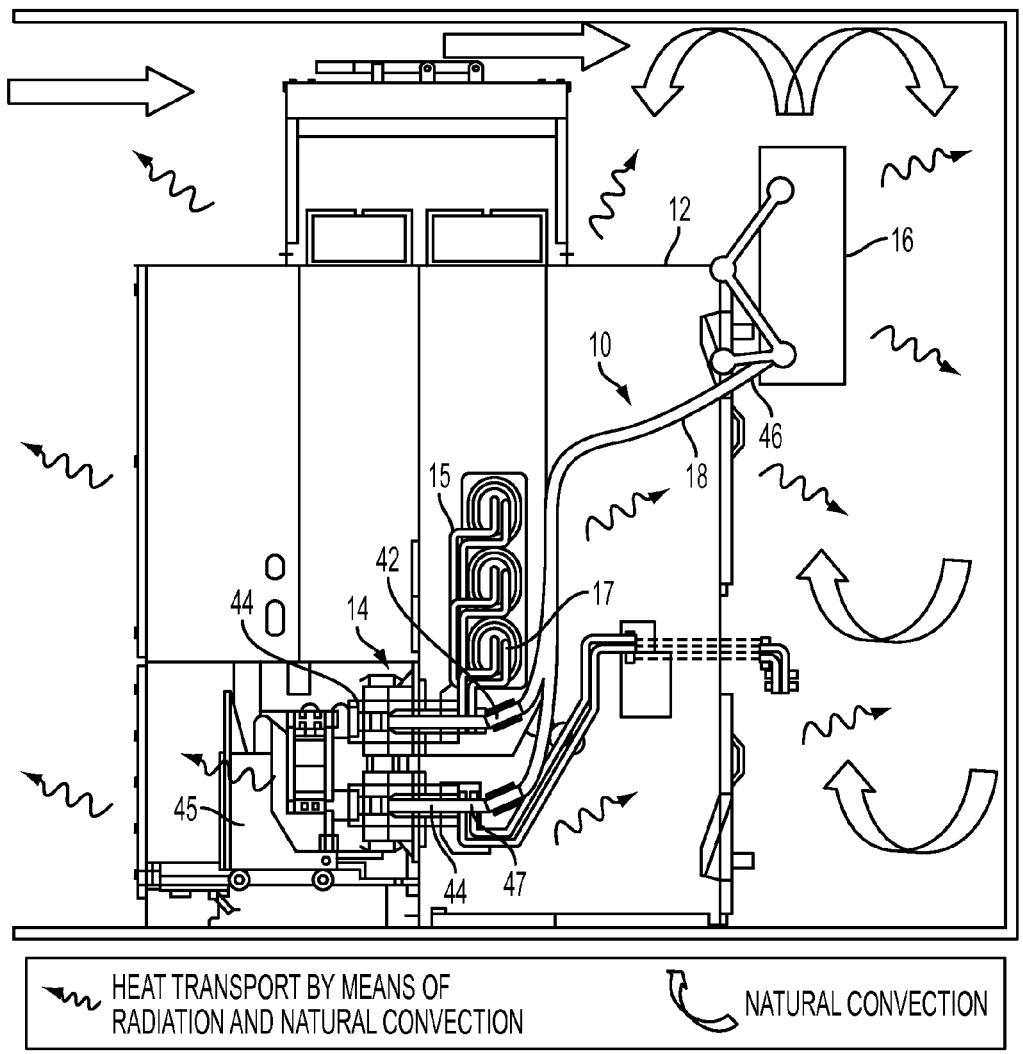
FIG. 1 is a view of a conventional evaporative cooling system in the form of a heat pipe structure and conventional condenser, shown mounted in a switchgear.
Figure 4:
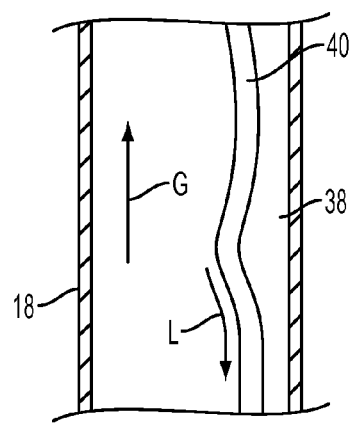
FIG. 4 is a sectional view of a portion of a tubing structure for coupling to the condenser of FIG. 2.

A bottom end cap, generally indicated at 34, is received in the second opened end 24 to close the second opened end 24. The bottom end cap 34 includes port structure 36 that connects the heat pipe or tubing structure 18 of FIG. 1 (and shown in FIG. 6) with the volume V of the base 20. With reference to FIGS. 1 and 4, the tubing structure 18 includes an internal cavity 38 and a liquid return tube 40 in the internal cavity 38. End 42 of the tubing structure is in fluid communication with an evaporation chamber associated with a primary contact 44. The evaporator chamber can be considered to be part of the end 42 of the tubing structure 18. Liquid working fluid 47 is disposed in the evaporation chamber. The other end 46 of the tubing structure 18 is coupled to the port structure 36 of the bottom cap 34. The end caps 28 and 34 close the volume V.

Figure 5A:
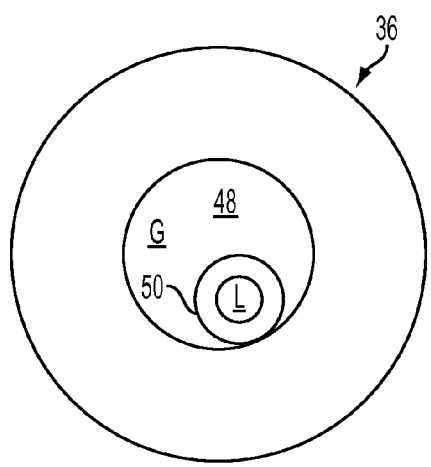
FIG. 5a is an end view of port structure of the bottom end cap of the condenser of FIG. 2.
Figure 5B:
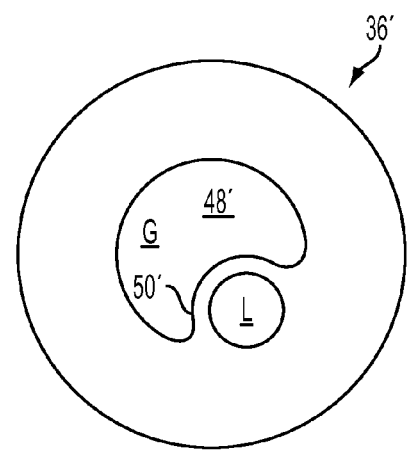
FIG. 5b is an end view of another embodiment of the port structure of the bottom end cap of the condenser of FIG. 2.

FIG. 5a shows an end view of the port structure 36 having at least two separated tubes defining a channel 48 for vapor (G) and a channel 50 for liquid working fluid (L). Channel 48 communicates with internal cavity 38 of the tubing structure 18 and channel 50 communicates with the liquid return tube 40 of the tubing structure 18. Alternatively, as shown in FIG. 5b, the port structure 36' could be made from an extruded profile with at least two separated channels 48' (for gas G) and 50' (for liquid working fluid L).

The condenser 16' can be used instead of the condenser 16 in the system of FIG. 1 for evaporative cooling of heat generating components such as primary contacts 44 associated with a circuit breaker 45. Thus, the heat pipe cooling system operates to cool a first location (e.g., near the heat generating components associated with the main bus 15 such as coupled with the bus bars 17 or coupled with the primary contacts 44) by transferring heat from the first location to a second location via the use of a working fluid 47. Liquid working fluid 47 resides in the bottom of each evaporator chamber associated with a primary contact as disclosed in co-pending U.S. application Ser. No. 13/444,888, filed on Apr. 12, 2012, the content of which is hereby incorporated by reference into this specification. Heat from the primary contact 44 causes the liquid working fluid 47 to evaporate, primarily in the evaporator chamber. Thereafter, the working fluid (mainly in a gaseous or vapor state G) travels upstream through the internal cavity 38 of the tubing structure 18, through the channel 48 of the port structure 36 of the bottom cap 34 and to the volume V of the condenser 16' where the heat is released as a substantial portion of the evaporated working fluid condenses back to a liquid state. The condensed (e.g., liquid L) working fluid then travels downstream from the condenser 16', through the liquid-return tube 50 and back to the evaporator chamber associated with the primary contact 44 to complete the cooling cycle.

Figure 6:
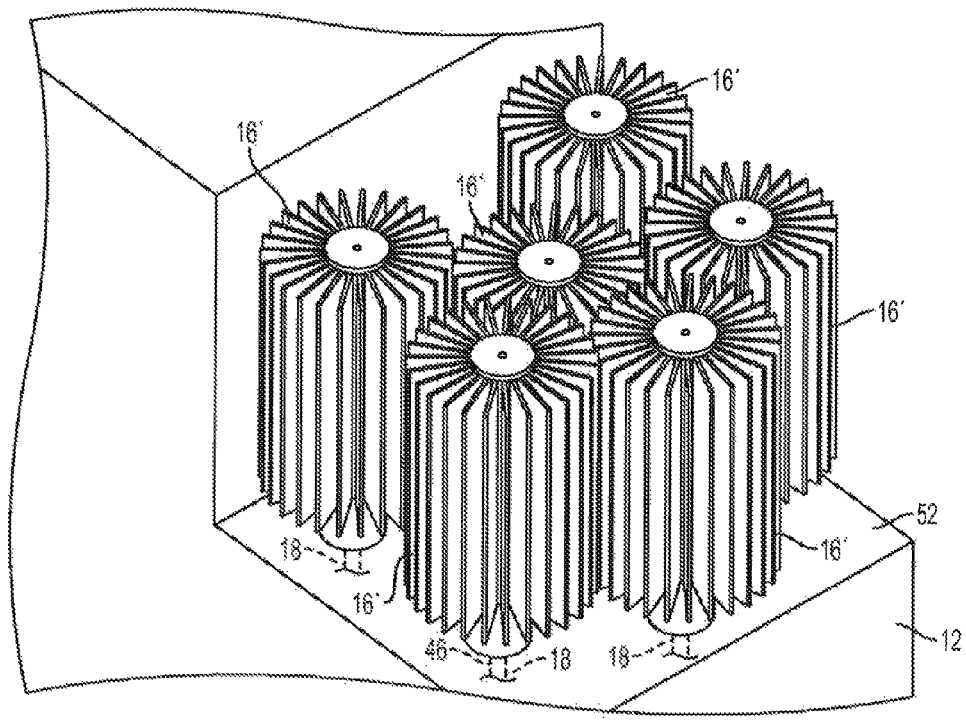
FIG. 6 is a view of six condensers of the embodiment shown mounted on top of a switchgear enclosure and connected with tubing structure.

With reference to FIG. 6, a condenser 16' is fluidly coupled with an associated tubing structure 18 to provide cooling for various locations within the switchgear enclosure 12 such as the bus bars 17 and primary contacts 44. As shown, six separate condensers 16' are provided and are mounted in an adjacent manner to a top 52 of the enclosure 12. As noted above, in operation, the vapor enters the volume V from an associated tubing structure 18 and condensates all along the inner surface of the base 20. The heat is released by the phase-change (vapor to liquid), conducted through the aluminum fins 26 and is emitted to the ambient mainly by natural air convection at the outer surface of the fins 26. The condensate is collected at the bottom of each condenser 16' and is drained off in channel 50 and return tube 40, solely by gravity.

As noted above, the vapor condensates all along the inner surface of the tubular base 20. The thermal condensation resistance is reduced by increasing this inner surface area. This surface area can be increased by having an axially corrugated or even slightly finned structure at the inside surface of the base 20.

The optimal utilization of space (max [$Area_{Conv}$/$Volume_{Condenser}$]) is fulfilled if the diameter of the tubular base 20 is equal to the length of the fin 26. In other words, the total outer diameter of the finned construction is approximately three-times the length of each fin 26, leading to the optimal utilization of space behind the plenum (see FIG. 6).

The total outer surface area of the condenser 16', e.g., its natural convection resistance, is determined by the total heat flux of each system. For example, the removal of 350 Watt of heat requires about 3.9 square-meter of surface (e.g., the heat (350 W) is removed solely by natural convection of ambient air with a temperature of 40° C. (worst case) and given a condenser wall temperature of above 70° C.). As mentioned above, the tube-diameter is equal to the fin-length what leads to the estimate equation:

$$A = 2\frac{\pi s}{d}sh \rightarrow s = \sqrt{\frac{Ad}{2\pi h}}$$

with the total (fin) surface A, condenser height h, fin-length s, and a given distance between the fins d. With this example, the length of the fins is approximately s=0.11 meters.

Figure 7:
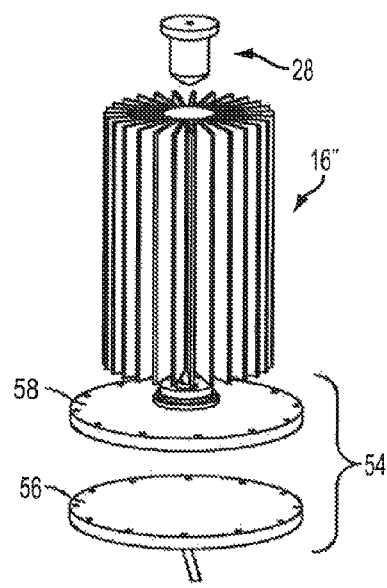
FIG. 7 is an exploded view of a star-shaped condenser, provided in accordance with a second embodiment, with a plate-to-plate-connection.

Up to now, the condenser 16 was an intrinsic part of the heat pipe cooling system, and directly connected to the vacuum-tight tubing system. For assembly sake, it would be advantageous to handle the condenser completely separate from the evaporator/tubing system in order to reduce the total weight and avoid any damage to the condenser while assembling the switchgear equipment at the site. Such a decoupling could be achieved by a second embodiment of the condenser 16", thermally and mechanically attached with a plate-to-plate connector 54 as shown in FIG. 7. Two heat pipes 18 (not shown) in series are connected with the plates 56 and 58.

The condenser 16', 16" reduces manufacturing cost, is less cumbersome and lighter than the conventional condenser 16 that is built from one common aluminum body with six independent chambers for each of the heat pipes. The six condensers have to fit behind the plenum and on top of the switchgear enclosure 12, a very space limited area. The condensers 16', 16" are modular and easily adaptable (e.g., limited in height) for such limited space. The condenser body with fins is extruded (e.g., as one-piece) and little additional machining is necessary enabling a cost-efficient solution. The volume V of the tubular base 20 is spacious enough so that the container 30 with the drying agent can be included. With other condenser configurations, this container would be attached at the outside, thus adding manufacturing cost since it needs to be sealed vacuum-tight. The axially symmetric configuration eases the separation of the liquid from the vapor phase at the bottom end cap 34. In the embodiment of FIG. 6, every heat pipe 18 is equipped with its own condenser 16'; thus the weight of the system is reduced and the assembly with the switchgear equipment simplified.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A cooling system comprising:
    a switchgear having at least one heat generating component inside an enclosure, and a tubing structure associated with the heat generating component, a working fluid being disposed within an end portion of the tubing structure that is associated with the heat generating component, and
    a condenser external to the switchgear and comprising:
        a hollow tubular base defining a volume and having first and second opposing opened ends, the base having a circumference,
        a plurality of fins extending from a periphery of the base, the fins being in spaced relation and disposed about the entire circumference of the base and constructed and arranged to be exposed to ambient air outside the switchgear,
        a first end cap separate from and physically coupled to the base so as to close the first opened end,
        a second end cap physically coupled to the base to close the second opened end, the second end cap having a port structure constructed and arranged to fluidly communicate the tubing structure with the volume so that when the working fluid is heated to a vapor state by the heat generating component, the tubing structure is constructed and arranged to transfer the vapor to the condenser, with the fins transferring heat to the ambient air by natural convection and the vapor being phased changed to liquid within in the volume of the base, the liquid being passively returned back to the end portion of the tubing structure thereby cooling the at least one heat generating component, and
        a connector mounting the condenser so as to be able to be decoupled from the tubing structure, with the tubing structure being removably coupled with the connector, without destruction of the tubing structure or the connector, and in fluid communication with the port structure of the second end cap, wherein the connector comprises first and second plates directly removably coupled to each other, with the first plate defining the second end cap disposed entirely outside of the enclosure and the second plate being coupled with the tubing structure such that upon decoupling of the first and second plates, the condenser and the first plate can be completely separated from the tubing structure and thus the switchgear entirely externally of the enclosure, with the second plate and tubing structure remaining with the switchgear.

2. The cooling system of claim 1, wherein the fins extend from the base in a cantilever manner.

3. The cooling system of claim 1, wherein the fins and the base are an integral extrusion.

4. The cooling system of claim 1, wherein the condenser is symmetrical about a longitudinal axis thereof.

5. The cooling system of claim 1, wherein the first end cap includes a container constructed and arranged to receive a drying agent therein that is adapted to absorb diffused water.

6. The cooling system of claim 1, wherein the port structure includes first and second channels therein, the first channel being constructed and arranged to receive the vapor and the second channel being constructed and arranged to receive the liquid.

7. The cooling system of claim 6, wherein the tubing structure includes an internal cavity in fluid communication with the first channel and a liquid return tube, in the internal cavity, and in fluid communication with the second channel.

8. The cooling system of claim 7, wherein a plurality of separate condensers are provided, each said separate condensers being connected with an associated tubing structure and each said separate condensers being mounted in an adjacent manner to a top of the enclosure of the switchgear.

9. The cooling system of claim 8, wherein a length of each fin is approximately 0.11 meters.

10. The cooling system of claim 1, wherein the heat generating component is a primary contact of the switchgear.

\* \* \* \* \*